United States Patent [19]
Van Duuren et al.

[11] 3,963,867
[45] June 15, 1976

[54] METHOD FOR INDICATING A FREE-LINE STATE IN A BINARY DATA COMMUNICATION SYSTEM

[75] Inventors: Hendrik Cornelis Anthony Van Duuren, Wassenaar; Herman da Silva, Voorburg, both of Netherlands

[73] Assignee: De Staat der Nederlanden, te Dezen Vertegenwoordigd Door de Directeur-Generaal der Posterijen, Telegrafie en Telefonie, Netherlands

[22] Filed: Feb. 27, 1975

[21] Appl. No.: 553,474

Related U.S. Application Data

[63] Continuation-in-part of Ser. No. 340,345, March 12, 1973, abandoned.

[52] U.S. Cl. .................................. 178/69 G; 178/3
[51] Int. Cl.² ......................................... H04L 11/08
[58] Field of Search ............... 178/69 G, 69 A, 3, 2, 178/79; 328/119; 340/147 R

[56] References Cited
UNITED STATES PATENTS

| | | |
|---|---|---|
| 2,870,429 | 1/1959 | Hales .................................. 178/79 |
| 3,453,551 | 7/1969 | Haberle ............................. 328/119 |
| 3,731,203 | 5/1973 | Lieberman ........................ 178/69 G |
| 3,735,043 | 5/1973 | Riethmeier et al. .............. 178/69 G |

Primary Examiner—Thomas A. Robinson

[57] ABSTRACT

A method for indicating the free-line state of a subscriber's line connected to a terminal exchange in a binary data communication system comprising generating and transmitting to the exchange a special code word or byte of a plurality of a fixed number of "0" and "1" bits, such as alternate "0" and "1" bits. This special code word is sent after the closing signal at the end of the communication or traffic, which closing signal comprises a byte of only one "1" bit and nine "0" bits, and before the start-again-of-traffic signal, which start signal comprises a byte of only one "0" bit and nine "1" bits. The special free-line state code signal or byte not only indicates the line is free but also can, by the frequency of its alternate bits, indicate to the exchange terminal its modulation rate so that the subscriber can be automatically connected for the next traffic at this rate. Furthermore, by supplying a free-line signal having other than just one "1" bit per byte, a breach in the line is more easily detectable.

9 Claims, 1 Drawing Figure

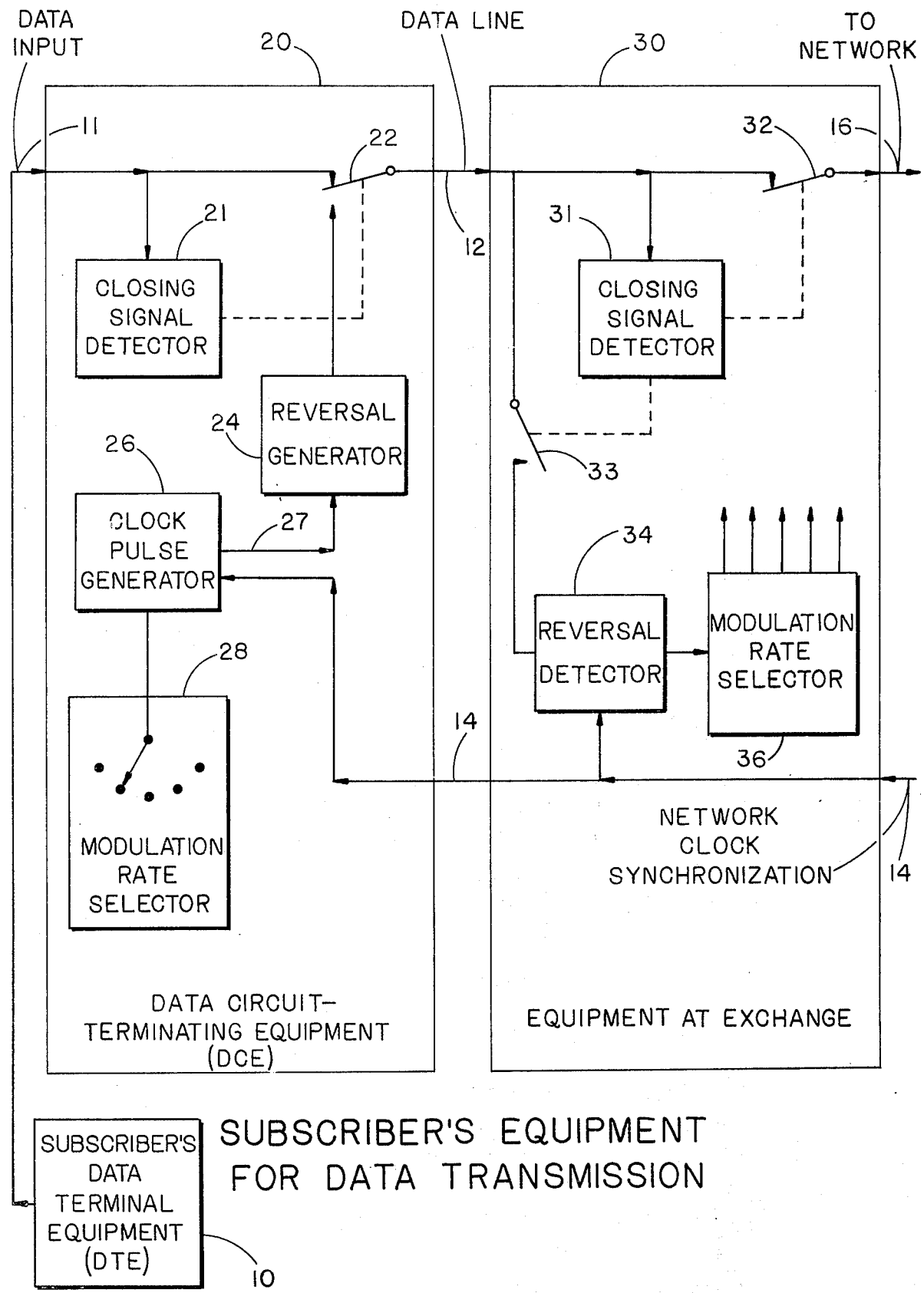

METHOD FOR INDICATING A FREE-LINE STATE IN A BINARY DATA COMMUNICATION SYSTEM

RELATED APPLICATION

This is a continuation-in-part of applicants' copending U.S. Pat. application Ser. No. 340,345, filed Mar. 12, 1973, and now abandoned.

BACKGROUND OF THE INVENTION

Previously in data communication systems of binary code words or bytes of a predetermined number of bits, usually six or eight bits per byte, traffic status comprised permutations and combinations of "0" and "1" bits per byte or code word in which the first bit of each byte was a framing bit. Then when the traffic was completed, signalling status bytes were transmitted by the subscriber indicating that the traffic was ended and the line was free for further traffic, which free-line signal comprised only a series of "0" bits and one "1" bit per byte, and a start-of-traffic signal of only a series "1" bits and one "0" bit byte. This combined end-of-traffic and free-line indication signal however gave only poor information with regard to occurrences of a breach in the line. The "1" bit is a synchronization bit and the second bit was a "0" bit if the line was in a signalling status, and is a "1" bit if there is data-traffic. However, this signal is very poor for line-guard purposes, e.g. the "1" bit has to be recognized between a series of "0" bits and the frequency-spectrum of such a signal is very bad.

SUMMARY OF THE INVENTION

Generally speaking, the novel method of indicating a free-line in the binary code communication system for a subscriber according to the present invention comprises the generation and transmission of a fixed pattern of "1" and "0" bits in each byte or code word after an end of traffic or clearing signal has been transmitted. This pattern of signals is not detected as traffic or a start signal; it immediately establishes bit-sychronism; and it still can give an indication of a breach in the line. An additional advantage of this pattern, particularly if it comprises alternate reversal of the bits, is that it automatically gives an indication at the exchange connected to the subscriber what the modulation rate of that subscriber's signal is, so that it can be immediately selected for the next communication to and from that subscriber.

This method may be accomplished by detecting from the data circuit terminating equipment (DCE), the end of the data or end of the traffic signal, and then after it has been transmitted, switching the out-put conductor to a generator that generates the new fixed pattern or alternate reversal of bits in each byte or code word signal. This generator is controlled by a clock pulse generator, which in turn is synchronized by the network sync pulses. Thus the alternate pattern which is transmitted to the exchange of the communication network, can immediately detect not only that the subscriber's line is free but whether or not there is a fault in the line, and also from the frequency of the reversals or pattern of bits per byte, the modulation rate at which the subscriber receives or transmits signals. Thus the closing signal detectors in the DCE and the exchange detect the end-of-traffic signal, after which the DCE starts to transmit reversals to the reversal detector in the exchange. This detector in the exchange determines if there is a breach in the line. This detector also controls a modulation selector for modulating the traffic signals to and from the subscriber, when the traffic is recommenced upon receipt of a start-of-traffic code word signal.

OBJECTS AND ADVANTAGES

Accordingly it is an object of this present invention to produce a simple, efficient, effective, and economic method for indicating a free-line state in a binary data communication system by a signal of bits of the regular byte lengths, which will indicate a breach in the line and immediately establish signal synchronization.

Another object is to produce such a method of indicating a free-line state which does not require any means for determining the length of the byte at the exchange terminal of a subscriber.

Another object is to have a minimum amount of apparatus in the exchange terminal for determining a free-line state.

A still further object and advantage is to produce a repetitive bit pattern in a free-line state indicating signal which also automatically indicates at the exchange the frequency of modulation of that subscriber's signals for automatic connection of that subscriber to signals modulated at that rate.

BRIEF DESCRIPTION OF THE VIEW

The above mentioned and other features, objects and advantages, and the manner of obtaining them, are described more specifically below by reference to an embodiment of this invention shown in the accompanying drawing, wherein:

The FIGURE or drawing shows a schematic block diagram of the particular subscriber's equipment in a data communication system at his station and his network terminal for carrying out the method of this invention.

DETAILED DESCRIPTION OF PREFERRED EMBODIMENT

Referring to the drawing there is disclosed the subscriber's data terminal equipment (DTE) 10 where data is collected and transferred, which equipment 10 is connected by a conductor 11 to the data circuit-terminating equipment (DCE) 20 at the subscriber's station which equipment 20 provides all the functions required to establish, maintain and terminate a connection, and the signal conversion between the data line 12 which connects that particular subscriber's equipment to his corresponding equipment 30 at the exchange. These pieces of equipment 20 and 30 are synchronized via a clock pulse conductor 14 from synchronization pulses from the network clock.

The input 11 to the data circuit-terminating equipment (DCE) 20 at the customer's or subscriber's station is connected to a closing or end-of-traffic signal detector 21. After this closing signal has been transmitted over the data line 12 to the exchange terminating equipment 30, the detector 21 operates the switch 22 to transmit thereafter only the repeated pattern of bits in each byte generated in the bit pattern or reversal generator 24. This generator 24 is controlled by a clock pulse generator 26 via conductor 27, which in turn may be controlled by a manually controlled modulation rate selector 28. The clock pulse generator 26 is synchronized by conductor 14 from the network clock. Thus the repeated pattern or reversal of bits in each byte or signalling code word generated in the free-line indicating generator 24 is conducted over the data line interface 12 to be received in the terminal equipment 30 for that subscriber at the exchange.

As soon as the closing signal has been received in the subscriber's exchange terminal 30, it is detected in a closing signal detector 31 which operates switch 32 to disconnect the subscriber's line from the exchange apparatus and also operates a switch 33 to connect the incoming fixed pattern of reversal bit bytes or free-line indicating signals directly to the reversal detector 34. This exchange reversal detector 34 is in pulse or bit synchronism with the clock pulse generator 26 via conductor 14 as well as being in immediate word or byte synchronism with the received free-line state signals. In turn this exchange reversal detector 34 controls the modulation rate selector 36 for selecting automatically the modulation rate of the signals to be received and sent by and from the network's output conductor 16.

If a breach in the conductor 12 occurs, no "1" bits will be detected by the reversal detector 34 thereby indicating this faulty condition. But, if there is no fault in the line 12, the detector 34 will positively indicate that the subscriber's data circuit-terminating equipment 20 has a free-line available for receiving or transmitting traffic, and also at what modulation frequency this traffic is to be transmitted and received under the control of the modulation rate selector circuit 36.

While there is described above the principles of this invention in connection with specific apparatus, it is to be clearly understood that this description is made only by way of example and not as a limitation to the scope of this invention.

We claim:

1. In a two-way data telecommunication system between a subscriber's station and an exchange, a method for indicating to the exchange a free-line state to said subscriber's station, comprising:
   A. detecting a closing signal to the data communication at both said subscriber's station and said exchange,
   B. generating and transmitting a fixed pattern of "1" and "0" bits per byte in response to the detection of said closing signal at said subscriber's station, and
   C. detecting said fixed pattern of bits at said exchange for indicating a free and unfaulted line to said subscriber's station.

2. A method according to claim 1 wherein the fixed pattern of bits in the pattern comprises two.

3. A method according to claim 2 which the bits in the pattern comprise one "1" bit and one "0" bit.

4. A method according to claim 2 including automatically detecting the modulation frequency of the bits per byte at the terminal exchange.

5. A method according to claim 1 wherein said detecting of said fixed pattern of bits includes an indication of the modulation frequency of bits per byte for transmission and reception over said free-line to said subscriber's station.

6. A method according to claim 1 including synchronizing said generating and detecting means for said pattern of bits.

7. In a two-way binary data telecommunication system between a subscriber's station and an exchange connected to said station, the improvement comprising: means for indicating to the exchange a free-line state of said subscriber's station, said means comprising:
   A. separate detecting means at said subscriber's station and said exchange responsive to a closing signal for the data communication therebetween,
   B. generating means at said subscriber's station for generating a fixed pattern of "1" and "0" bits per byte,
   C. transmitting means at responsive to detection of a closing signal by said detection means at said subscriber's station for transmitting to said exchange said fixed pattern of bits generated by said generating means, and
   D. means at said exchange for detecting said transmitted pattern of bits for indicating a free-line to said subscriber's station.

8. A system according to claim 7 including: means at said exchange responsive to said pattern detecting means at said exchange for indicating the modulation frequency of said bits per byte for transmission and reception of signals over said free-line.

9. A system according to claim 7 including: means connected to said fixed pattern generating means at said subscriber's station and to said fixed pattern detecting means at said exchange for synchronizing said fixed pattern generating means and said fixed pattern detecting means.

* * * * *